(12) United States Patent
Wu et al.

(10) Patent No.: US 11,969,838 B1
(45) Date of Patent: Apr. 30, 2024

(54) ASSEMBLY PROCESSING DEVICE FOR OUTDOOR FOLDABLE CHAIR COMPONENTS

(71) Applicant: Yotrio Group Co., Ltd., Linhai (CN)

(72) Inventors: Hongwei Wu, Linhai (CN); Jianqiang Xie, Linhai (CN)

(73) Assignee: Yotrio Group Co. Ltd., Linhai (CN)

( * ) Notice: Subject to any disclaimer, the term of this patent is extended or adjusted under 35 U.S.C. 154(b) by 0 days.

(21) Appl. No.: 18/220,259

(22) Filed: Jul. 10, 2023

(51) Int. Cl.
*B23P 19/04* (2006.01)
(52) U.S. Cl.
CPC .................................... *B23P 19/04* (2013.01)
(58) Field of Classification Search
CPC ....................................................... B23P 19/04
USPC .................................. 29/700, 791, 430, 431
See application file for complete search history.

(56) References Cited

U.S. PATENT DOCUMENTS 5,608,956 A * 3/1997 Seki ......................... B60N 2/90
29/434
10,799,927 B2 * 10/2020 Liang .................... A01K 1/0245

FOREIGN PATENT DOCUMENTS

CN 106903919 A * 6/2017 ......... B29D 99/0092
EP 1329296 A2 * 7/2003 .............. B23P 19/04

OTHER PUBLICATIONS

English Machine Translation of CN-106903919-A (Year: 2017).*

* cited by examiner

*Primary Examiner* — Sarang Afzali
*Assistant Examiner* — Darrell C Ford
(74) *Attorney, Agent, or Firm* — Jingming (James) Cai; SAC Attorneys LLP

(57) ABSTRACT

An assembly processing device for outdoor foldable chair components is provided. The assembly processing device includes an operating platform, a conveying mechanism, and a component placement boss. The operating platform is provided with a component placing platform and a predetermined number of concaving mechanisms, positioning mechanisms, and assembly mechanisms. The positioning mechanisms and the assembly mechanisms are disposed on the component placing platform. The conveying mechanism is disposed between the component placing platform and the operating platform. The conveying mechanism conveys a component to be processed to one or more of the concaving mechanisms for concaving, on the component placing platform. The component placement boss is disposed on the component placing platform. The assembly processing device improves the assembly and concaving of foldable chair components and improves production efficiency of a foldable chair assembly line.

8 Claims, 5 Drawing Sheets

ASSEMBLY PROCESSING DEVICE FOR OUTDOOR FOLDABLE CHAIR COMPONENTS

CROSS-REFERENCE TO RELATED APPLICATIONS

This application claims priority to and the benefit of the patent application titled "An assembly processing device for outdoor foldable chair components", application number 2023201796075, filed in the China National Intellectual Property Administration on Feb. 10, 2023. The specification of the above-referenced patent application is incorporated herein by reference in its entirety.

FIELD OF THE INVENTION

The present invention, in general, relates to outdoor furniture, and in particular, relates to an assembly processing device for outdoor foldable chair components.

BACKGROUND

Outdoor furniture is widely and increasingly being used in daily life. Outdoor furniture is often placed outdoors, for example, in outdoor plazas, gateways of malls and shops, open areas, etc., for people to rest and enjoy leisure time. Outdoor furniture includes outdoor chairs which are classified into fixed chairs and foldable chairs by function and style. Compared to a fixed chair, a foldable chair has a smaller overall package volume and can be folded, thereby providing better market prospects.

However, processing of conventional outdoor foldable chairs typically requires manual assembly and fixing of foldable components with pipes. Moreover, embedded components of the outdoor foldable chairs need to be concaved before assembly to preclude disengagement of the foldable components from the pipes after assembly and to improve installation stability. However, in a conventional assembly process, the concaving process requires multiple manual sub-procedures, which reduce production efficiency and may cause omissions by personnel who are unqualified in concaving, which may cause defects after assembly, thereby impacting the production line of foldable chairs.

SUMMARY OF THE INVENTION

To address the above-recited problems, the present invention provides an assembly processing device for outdoor foldable chair components, which improves assembly and concaving of foldable chair components and improves production efficiency of a foldable chair assembly line.

The assembly processing device for outdoor foldable chair components disclosed herein comprises an operating platform, a conveying mechanism, and a component placement boss. The operating platform is provided with a component placing platform and a predetermined number of concaving mechanisms, positioning mechanisms, and assembly mechanisms. The positioning mechanisms and the assembly mechanisms are disposed on the component placing platform. The conveying mechanism is disposed between the component placing platform and the operating platform. The conveying mechanism is configured to convey a component to be processed to one or more of the concaving mechanisms for concaving, on the component placing platform. The component placement boss is disposed on the component placing platform.

In an embodiment, the operating platform comprises a platform body and a platform surface. The platform surface is disposed on an upper part of the platform body. The component placing platform is disposed on an upper part of the platform surface. In an embodiment, the conveying mechanism comprises two sliding rail assemblies disposed parallel to each other and a conveying drive assembly. In an embodiment, each of the sliding rail assemblies comprises a sliding rail and a slider. The slider is mounted on a bottom surface of the component placing platform. In an embodiment, the conveying drive assembly comprises a conveying cylinder and a conveying seat. The conveying seat is connected to a telescopic end of the conveying cylinder. The conveying seat is fixed to the bottom surface of the component placing platform.

In an embodiment, the platform surface of the operating platform is provided with a first stroke groove. The conveying drive assembly is mounted on the first stroke groove. The conveying seat is configured to move along the first stroke groove in a reciprocating mode.

In an embodiment, each of the positioning mechanisms comprises a positioning cylinder and a positioning block. The positioning block is connected to a telescopic part of the positioning cylinder. The positioning block is configured to match with a to-be-processed component placed on the component placement boss.

In an embodiment, the predetermined number of the positioning mechanisms is two (2). The positioning mechanisms are symmetrically arranged on the component placing platform.

In an embodiment, each of the assembly mechanisms comprises an assembly cylinder and an assembly top base. The assembly top base is positioned at a telescopic part of the assembly cylinder. The assembly top base is provided with a component groove.

In an embodiment, the predetermined number of the assembly mechanisms is two (2).

In an embodiment, each of the concaving mechanisms comprises a base table and a concaving cylinder. The concaving cylinder is disposed on the base table. A bottom part of the concaving cylinder is provided with an ejector.

In an embodiment, the predetermined number of the concaving mechanisms is two (2). The base table of one of the concaving mechanisms is configured to penetrate a second stroke groove. The second stroke groove is positioned on the component placing platform.

The present invention is suitable for the assembly and concaving of foldable chair components through its optimized design, improves the assembly processing efficiency of foldable chair components, facilitates production efficiency of the foldable chair assembly line, and ensures production quality of the product assembly.

To understand the characteristics of the present invention, refer to the drawings and the following detailed description of the invention.

DETAILED DESCRIPTION OF THE INVENTION

To make the technical means, creative features, purposes achieved, and effects of the present invention easy to understand, the following is a further elaboration of the present invention combined with specific illustrations.

Figure 1:
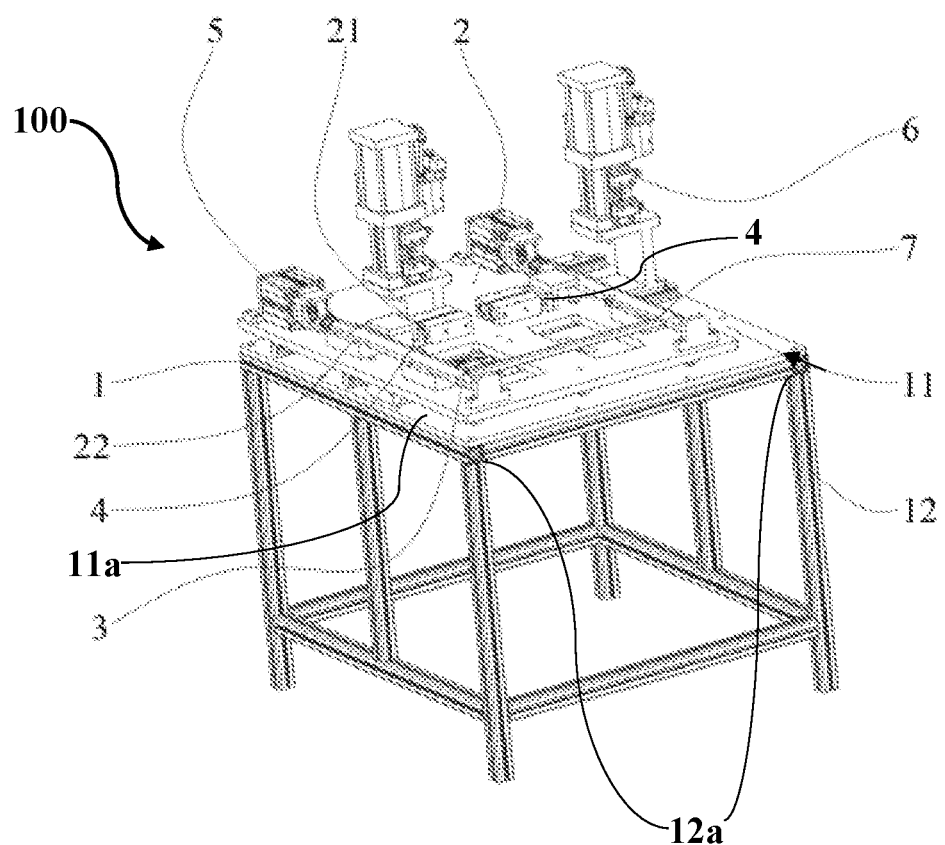
FIG. 1 is a structural diagram of an assembly processing device for outdoor foldable chair components.
Figure 2:
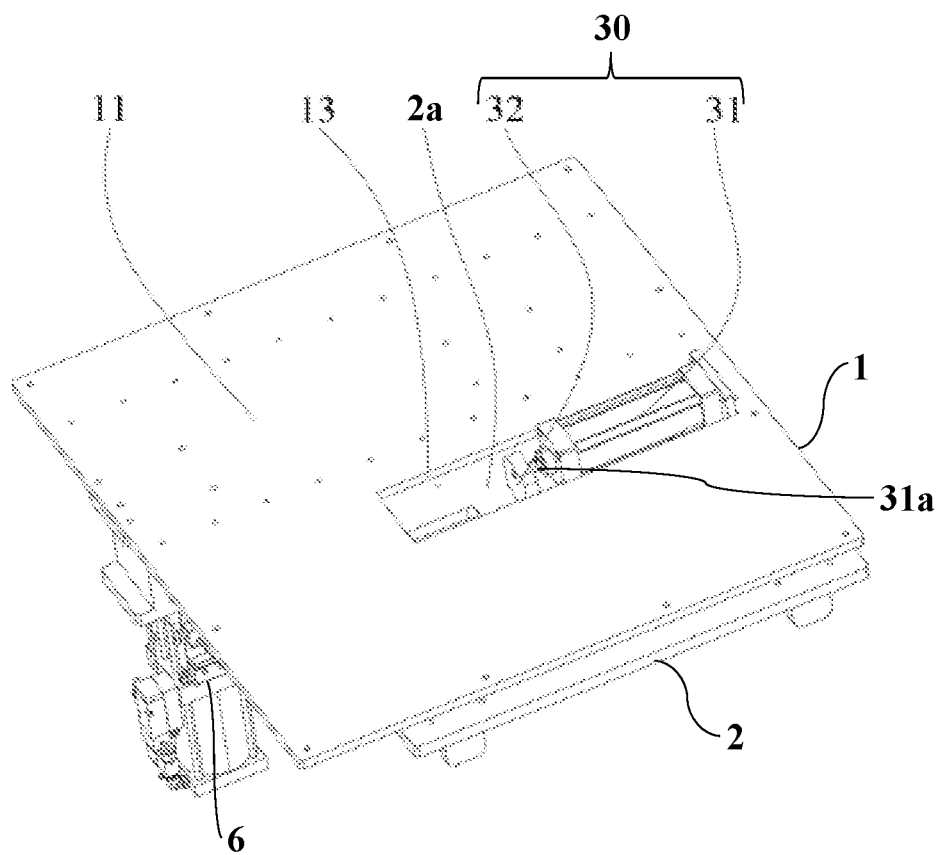
FIG. 2 is a structural diagram of a conveying mechanism disposed between a component placing platform and an operating platform of the assembly processing device.
Figure 3:
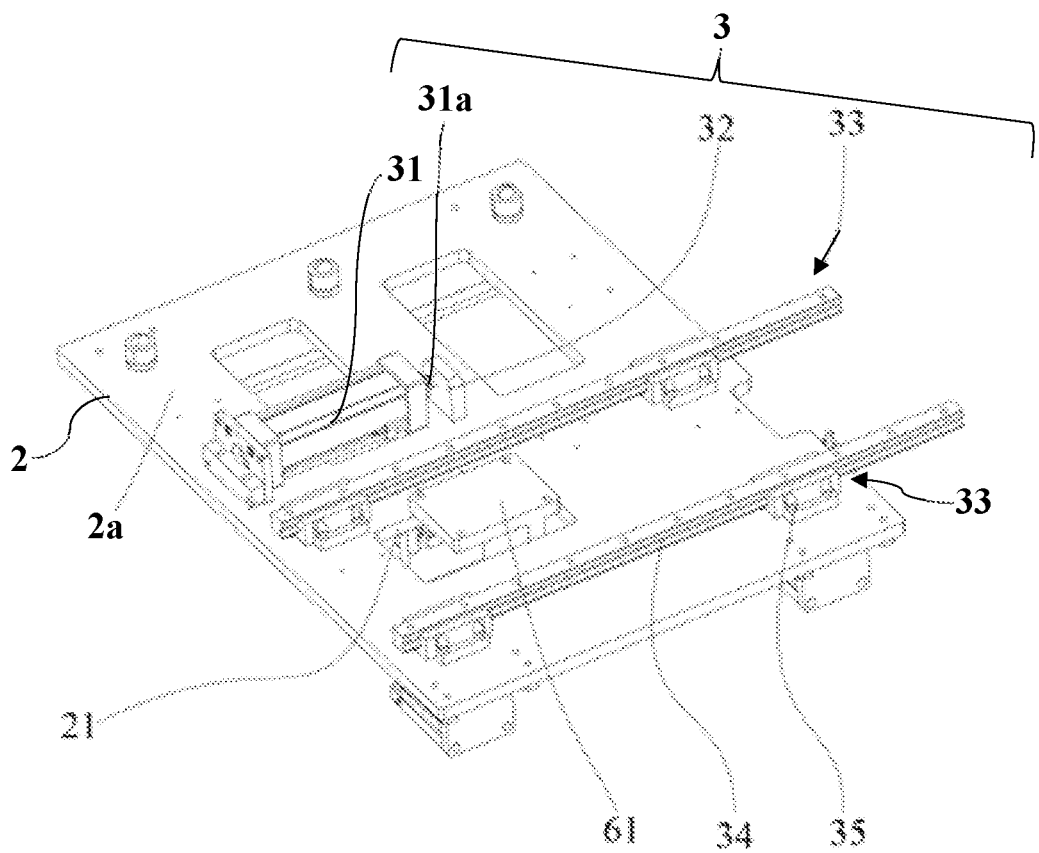
FIG. 3 is a structural diagram of a bottom surface of the component placing platform.
Figure 4:
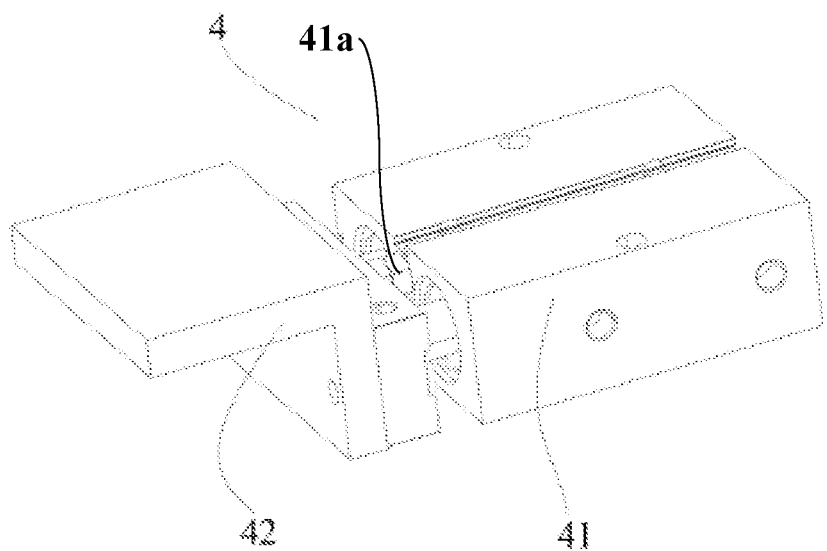
FIG. 4 is a structural diagram of a positioning mechanism of the assembly processing device.
Figure 5:
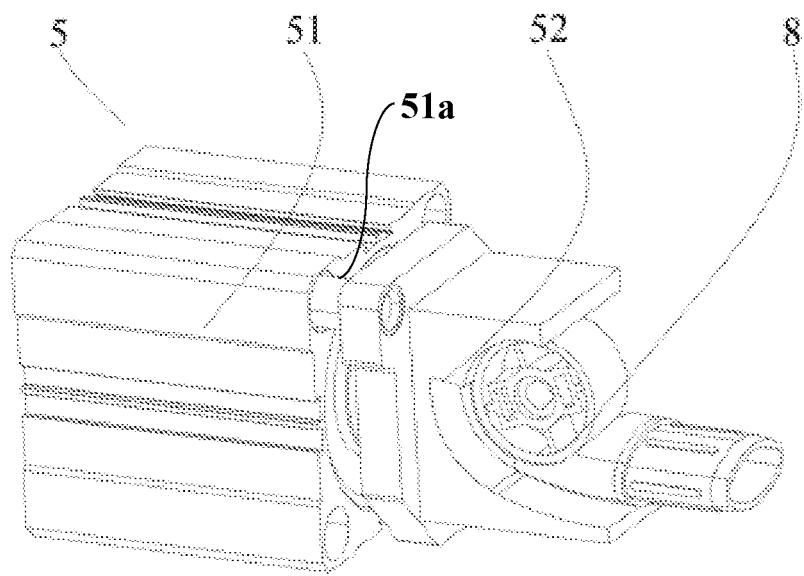
FIG. 5 is a structural diagram of an assembly mechanism of the assembly processing device, showing a to-be processed component disposed in a component groove of the assembly mechanism.
Figure 6:
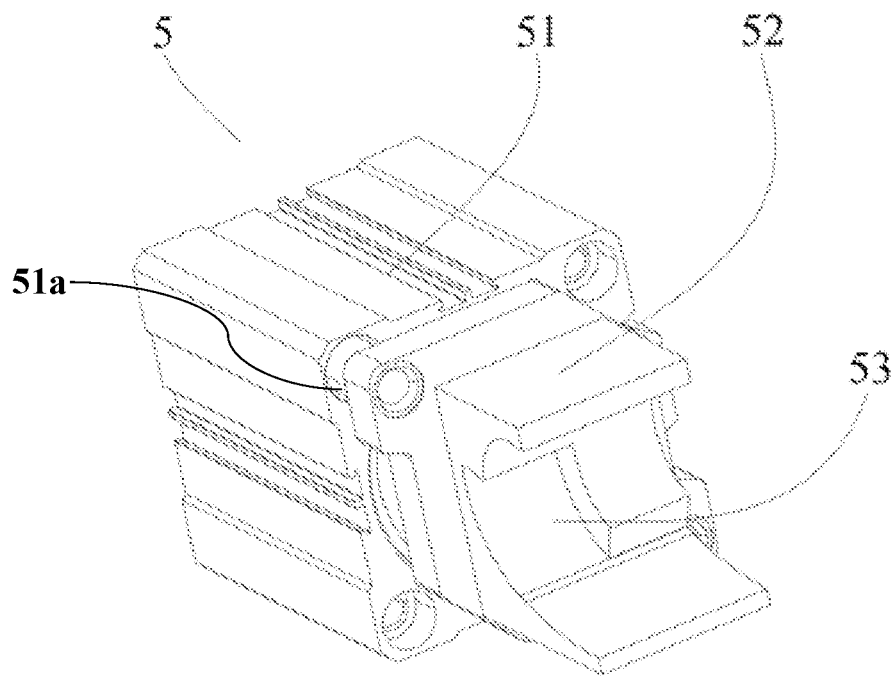
FIG. 6 is a structural diagram of the assembly mechanism of the assembly processing device, showing the component groove of the assembly mechanism.
Figure 7:
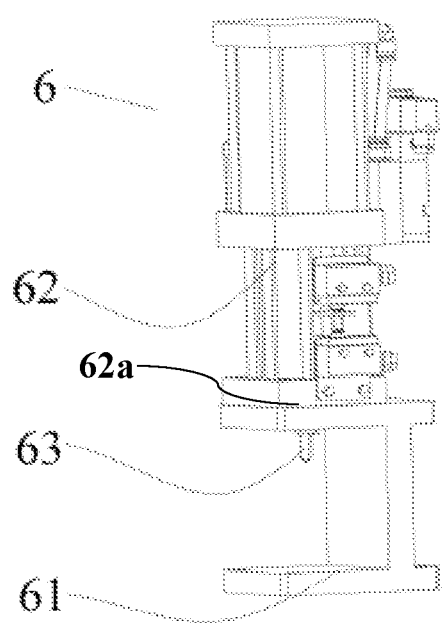
FIG. 7 is a structural diagram of a concaving mechanism of the assembly processing device.

Disclosed herein is an assembly processing device 100 for outdoor foldable chair components as shown in FIG. 1. The assembly processing device 100 comprises an operating platform 1, a conveying mechanism 3, and a component placement boss 22 as shown in FIG. 1. The operating platform 1 is provided with a component placing platform 2 and a predetermined number of concaving mechanisms 6, positioning mechanisms 4, and assembly mechanisms 5 as shown in FIGS. 1-7. The conveying mechanism 3 is disposed between the component placing platform 2 and the operating platform 1 as shown in FIG. 2. The positioning mechanisms 4 and the assembly mechanisms 5 are both positioned on the component placing platform 2, where the component placing platform 2 is provided with the component placement boss 22. The component placement boss 22 is disposed on the component placing platform 2. The component placement boss 22 is configured to accommodate a to-be-processed component 7 placed thereon as shown in FIG. 1. Each positioning mechanism 4 shown in FIG. 1 and FIG. 4, is configured to fix the to-be-processed component 7. Each assembly mechanism 5 shown in FIG. 1 and FIGS. 5-6, is configured to assemble and install a corresponding foldable, or pluggable, or other to-be-assembled component 8 shown in FIG. 5, to the to-be-processed component 7. After assembly, the conveying mechanism 3 conveys the to-be-processed component 7 to one or more of the concaving mechanisms 6 shown in FIG. 1 and FIG. 7, for concaving, on the component placing platform 2.

In an embodiment, the operating platform 1 comprises a platform body 12 and a platform surface 11. The platform surface 11 is disposed on an upper part 12a of the platform body 12 as shown in FIG. 1. The component placing platform 2 is disposed on an upper part 11a of the platform surface 11, forming a double parallel platform surface structure. In an embodiment, the conveying mechanism 3 comprises two sliding rail assemblies 33 disposed parallel to each other and a conveying drive assembly 30 as shown in FIG. 2 and FIG. 3. In an embodiment, each sliding rail assembly 33 comprises a sliding rail 34 and a slider 35. The slider 35 is mounted on a bottom surface 2a of the component placing platform 2. The sliding rail 34 and the slider 35 are mutually matched with and connected to each other as shown in FIG. 3. In an embodiment, the conveying drive assembly 30 comprises a conveying cylinder 31 and a conveying seat 32. The conveying seat 32 is connected to a telescopic end 31a of the conveying cylinder 31. The conveying seat 32 is fixed to the bottom surface 2a of the component placing platform 2 as shown in FIG. 3. The conveying cylinder 31 performs a telescopic movement relative to the conveying seat 32. The conveying seat 32 drives the component placing platform 2 to slide along the sliding rail assemblies 33 in a reciprocating mode.

In an embodiment, the platform surface 11 of the operating platform 1 is provided with a first stroke groove 13 as shown in FIG. 2. The conveying drive assembly 30 is mounted on the first stroke groove 13. The conveying seat 32 is configured to move along the first stroke groove 13 in a reciprocating mode. The structure of the first stroke groove 13 is optimized to form an accommodating space for facilitating the reciprocating movement of the conveying seat 32 therewithin.

In an embodiment, each positioning mechanism 4 comprises a positioning cylinder 41 and a positioning block 42. The positioning block 42 is positioned on a telescopic part 41a of the positioning cylinder 41 as shown in FIG. 4. The positioning block 42 is configured to match with the to-be-processed component 7 placed on the component placement boss 22 as shown in FIG. 1. In an embodiment, the predetermined number of the positioning mechanisms 4 is two (2). The positioning mechanisms 4 are symmetrically arranged on the component placing platform 2 as shown in FIG. 1. In an embodiment as shown in FIG. 4, the positioning block 42 is, for example, an "L"-shaped block, configured to facilitate the pressing and fixing of the to-be-processed component 7, and to avoid displacement of the to-be processed component 7 during assembly processing. The positioning block 42 can be removed and replaced to match with the to-be-processed component 7 of different specifications.

In an embodiment, each assembly mechanism 5 comprises an assembly cylinder 51 and an assembly top base 52 as shown in FIG. 5 and FIG. 6. The assembly top base 52 is positioned at a telescopic part 51a of the assembly cylinder 51. The assembly top base 52 is provided with a component groove 53 as shown in FIG. 6. In an embodiment, the predetermined number of the assembly mechanisms 5 is two (2). The component groove 53 in the assembly top base 52 is configured to match with and accommodate a to-be-assembled component 8, such as a foldable, pluggable, or another to-be-assembled component, as shown in FIG. 5. According to operation requirements, the assembly top base 52 can be removed from the assembly cylinder 51 and replaced to be applicable for assembling products or components with different specifications.

In an embodiment, each concaving mechanism 6 comprises a base table 61 and a concaving cylinder 62. The concaving cylinder 62 is positioned on the base table 61. A bottom part 62a of the concaving cylinder 62 is provided with an ejector 63. In an embodiment, the predetermined number of the concaving mechanisms 6 is two (2). The base table 61 of one of the concaving mechanisms 6 penetrates a second stroke groove 21 as shown in FIG. 3. The second stroke groove 21 is positioned on the component placing platform 2, and facilitates synchronous concaving and processing of, for example, two front or rear leg components of a foldable chair.

In an example, the to-be-processed component 7 refers to two front or rear leg components of a foldable chair, and the to-be-assembled component 8 is a foldable component configured to facilitate the assembly of the front and rear legs of the foldable chair. During processing of the foldable chair, in an example, operators place the front leg components of the foldable chair on the component placement boss 22 on the component placing platform 2. The component placement boss 22 comprises a concave groove structure configured to accommodate a chair pipe. The positioning cylinder 41 of the positioning mechanism 4 then drives the positioning block 42 to press and fix the chair pipe for stabilizing the chair pipe. The to-be-assembled component 8 is placed in the component groove 53 of the assembly top base 52 of the assembly mechanism 5. The assembly cylinder 51 in the assembly mechanism 5 then drives the assembly top base 52 to assemble the to-be-assembled component 8 into the chair pipe to complete assembly and installation of the front leg components. The conveying cylinder 31 in the conveying mechanism 3 then drives the conveying seat 32 to move for conveying the component placing platform 2 to the concaving mechanism 6. The to-be-processed component 7, after assembly, is positioned at the concaving mechanism 6. The concaving cylinder 62 of the concaving mechanism 6 drives the ejector 63 to concave specified parts of the component 7, thereby completing the assembly of the component 7.

The present invention is suitable for the assembly and concaving of foldable chair components through its optimized design, improves the assembly processing efficiency of foldable chair components, facilitates production efficiency of a foldable chair assembly line, and ensures production quality of the product assembly.

The above is only an embodiment of the present invention and does not limit the present invention in any form. Any revisions, equivalent changes, or modifications made to the above embodiments according to the technical principle of the present invention, belong to the scope of the technical scheme of the present invention.

We claim:

1. An assembly processing device for outdoor foldable chair components, the assembly processing device comprising:
    an operating platform provided with a component placing platform and a predetermined number of concaving mechanisms, positioning mechanisms, and assembly mechanisms, wherein the positioning mechanisms and the assembly mechanisms are disposed on the component placing platform, wherein the operating platform comprises a platform body and a platform surface disposed on an upper part of the platform body, and wherein the component placing platform is disposed on an upper part of the platform surface;
    a conveying mechanism disposed between the component placing platform and the operating platform, wherein the conveying mechanism is configured to convey a component to be processed to one or more of the concaving mechanisms for concaving, on the component placing platform, wherein the conveying mechanism comprises sliding rail assemblies disposed parallel to each other and a conveying drive assembly, wherein each of the sliding rail assemblies comprises a sliding rail and a slider mounted on a bottom surface of the component placing platform, wherein the conveying drive assembly comprises a conveying cylinder and a conveying seat connected to a telescopic end of the conveying cylinder, and wherein the conveying seat is fixed to the bottom surface of the component placing platform; and
    a component placement boss disposed on the component placing platform.

2. The assembly processing device according to claim 1, wherein the platform surface is provided with a first stroke groove, wherein the conveying drive assembly is mounted on the first stroke groove, and wherein the conveying seat is configured to move along the first stroke groove in a reciprocating mode.

3. The assembly processing device according to claim 1, wherein each of the positioning mechanisms comprises a positioning cylinder and a positioning block connected to a telescopic part of the positioning cylinder, and wherein the positioning block is configured to match with a to-be-processed component placed on the component placement boss.

4. The assembly processing device according to claim 1, wherein the predetermined number of the positioning mechanisms is two, and wherein the positioning mechanisms are symmetrically arranged on the component placing platform.

5. An assembly processing device for outdoor foldable chair components, the assembly processing device comprising:
    an operating platform provided with a component placing platform and a predetermined number of concaving mechanisms, positioning mechanisms, and assembly mechanisms, wherein the positioning mechanisms and the assembly mechanisms are disposed on the component placing platform, wherein each of the assembly mechanisms comprises an assembly cylinder and an assembly top base positioned at a telescopic part of the assembly cylinder, and wherein the assembly top base is provided with a component groove;
    a conveying mechanism disposed between the component placing platform and the operating platform, wherein the conveying mechanism is configured to convey a component to be processed to one or more of the concaving mechanisms for concaving, on the component placing platform; and
    a component placement boss disposed on the component placing platform.

6. The assembly processing device according to claim 5, wherein the predetermined number of the assembly mechanisms is two.

7. An assembly processing device for outdoor foldable chair components, the assembly processing device comprising:
    an operating platform provided with a component placing platform and a predetermined number of concaving mechanisms, positioning mechanisms, and assembly mechanisms, wherein the positioning mechanisms and the assembly mechanisms are disposed on the component placing platform;
    a conveying mechanism disposed between the component placing platform and the operating platform, wherein the conveying mechanism is configured to convey a component to be processed to one or more of the concaving mechanisms for concaving, on the component placing platform, wherein each of the concaving mechanisms comprises a base table and a concaving cylinder disposed on the base table, and wherein a bottom part of the concaving cylinder is provided with an ejector; and
    a component placement boss disposed on the component placing platform.

8. The assembly processing device according to claim 7, wherein the predetermined number of the concaving mechanisms is two, wherein the base table of one of the concaving mechanisms is configured to penetrate a second stroke groove, and wherein the second stroke groove is positioned on the component placing platform.

* * * * *